United States Patent [19]

Davis et al.

[11] 4,376,280
[45] Mar. 8, 1983

[54] INSTRUMENT SYSTEM FOR IRON OXIDE REDUCING KILNS

[75] Inventors: Richard H. Davis, Franklin, Tenn.; Brian F. Bracanin, Busselton; Ronald J. Clements, Capel, both of Australia

[73] Assignee: The Direct Reduction Corporation, New York, N.Y.

[21] Appl. No.: 250,006

[22] Filed: Apr. 1, 1981

[51] Int. Cl.³ .................. G01K 13/08; G08C 19/16
[52] U.S. Cl. ........................ 340/870.17; 374/154; 374/167
[58] Field of Search ................ 73/340, 341, 343 R, 73/351, 352, 362 AR; 340/870.17, 870.13, 595, 596

[56] References Cited

U.S. PATENT DOCUMENTS

| Re. 27,596 | 3/1973 | Hurd | 340/870.17 |
|---|---|---|---|
| 3,103,817 | 9/1963 | Ludwig | 73/341 |
| 3,273,874 | 9/1966 | Hucke | 73/351 |
| 3,331,247 | 7/1967 | Toepell | 73/351 |
| 3,379,062 | 4/1968 | Lellep | 73/351 |
| 3,396,581 | 8/1968 | Iten et al. | 73/351 |
| 3,584,510 | 6/1971 | Harris | 73/341 |
| 3,812,716 | 5/1974 | McIntyre | 73/351 |

*Primary Examiner*—Thomas A. Robinson
*Attorney, Agent, or Firm*—Cooper, Dunham, Clark, Griffin & Moran

[57] ABSTRACT

A system for monitoring the internal conditions in a rotary kiln is disclosed wherein a series of sensors, such as thermocouples, are installed in ports at various longitudinal and angular coordinates along the total length of the kiln for providing temperature signal samples in the form of sequenced millivolt signals, and a single thermocouple is provided which is insertable in a second series of ports along the kiln to permit immediate localized temperature sensing. The sequenced millivolt signals and the single thermocouple millivolt signals are both fed to respective millivolt-to-milliamp converters mounted on a heat shield on the kiln surface, which shield also mounts two sets of continuous slip rings encircling the kiln. The respective milliamp signals are communicated from the converters to the respective slip ring sets from which they are picked off by suitable stationary contact means disposed adjacent the kiln and conducted to appropriate recorders in a control room. The signals from the series of thermocouples are sequenced by respective routing to a series of junction boxes disposed circumferentially about the kiln shell and successive routing from each junction box under the control of a proximity switch system actuated by means of kiln rotation.

14 Claims, 3 Drawing Figures

INSTRUMENT SYSTEM FOR IRON OXIDE REDUCING KILNS

BACKGROUND OF THE INVENTION

The present invention relates to a system for monitoring the operation of rotary kilns and more particularly to a method and means for sensing temperatures within a rotary kiln, of the type such as used for the direct reduction of metal oxides using solid carbonaceous materials as both fuel and reductant, and displaying the sensed results at a remote location.

Temperature sensing and control is essential to the proper operation of a rotary kiln carrying out a direct reduction process such as the reduction of iron ores to directly reduced iron (DRI) or sponge iron using coal as the fuel and reductant. The temperatures within the kiln must be regularly sensed and accurately displayed to permit the kiln operators to supervise the process and initiate any necessary process changes or corrections promptly. The temperature sensors for this purpose have typically been thermocouples, disposed at spaced locations along the length of the kiln, which transmit low lever millivolt signal data from each location on the rotating kiln to a recorder in a central control room. The common technique has been to transmit the signals over fixed wires routed from each of the thermocouples along the kiln shell to a set of slip rings at a convenient central location on the kiln. The signals are then transferred from the slip rings through a set of sliding shoes at a stationary location adjacent the kiln and routed over further wires to the control room recorder. An example of a prior art system of this type is shown in U.S. Pat. No. 3,331,247 to Toepell wherein temperature indicative millivolt signals are generated from a number of thermocouples on a kiln, each of which thermocouples has one terminal connected to a common continuous slip ring mounted on the kiln, and another terminal connected to a separate segment of a segmented slip ring. A mechanically-actuated recorder switching system is also mounted on the kiln to permit transfer of the thermocouple signal voltages to an external receive in a sequential sampling sequence through brushes contacting the two slip rings.

These prior art systems have been plagued with a number of problems such as lack of temperature compensation of the signal at the slip rings junction, sliding contact noise and signal distortion, and long transmission line interference. Mechanical switching with physical contact has led to heavy maintenance requirements as the kiln expands and contracts and shifts longitudinally back and forth. Even with frequent calibrations and a thorough understanding of the system, accurate interpretation of data is difficult, and as calibration verification is normally accomplished with the kiln stopped, errors due to the sliding action between the rings in the stationary shoes during kiln rotation are not taken into consideration. There is, accordingly, a need in the art for an accurate, simple, easily-verified and calibrated and maintained kiln temperature measuring system.

The present invention is directed to providing such a temperature measuring system which eliminates many of the problems inherent in the prior art systems.

SUMMARY OF THE INVENTION

The present invention provides a system for measuring temperatures within a rotary kiln, either while stationary or rotating, at various longitudinal and angular coordinates along the total length of the kiln, which system consists of two subsystems, one consisting of a series of semipermanent thermocouples fixed in place along the kiln at the noted coordinates and a second consisting of a single thermocouple which is insertable in a series of ports along the kiln to permit immediate localized temperature sensing. The first subsystem provides temperature signal samples which are recorded on a remote multipoint recorder in a set sequence for each revolution of the kiln, and the signals from the single thermocouple of the second subsystem are recorded for the particular sensed location on an analog recorder at a remote location such as in a control room also containing the multipoint recorder. The signals from the thermocouples in the first subsystem are sequenced by respective routing to a series of junction boxes disposed circumferentially about the kiln shell and successive routing from each junction box under the control of a proximity switch system operated by means of kiln rotation.

The millivolt signals from the respective thermocouples in the two subsystems are routed along the kiln shell using temperature compensated mineral-insulated wire to two millivolt to milliamp converters, one for each subsystem, located on a slip ring heat shield mounted on the kiln. All of the thermocouple signal wire and associated terminal junctions including the terminals on the converters are temperature-compensated for minimum signal distortion, that is, the materials are all identical to that of the thermocouple wires. The millivolt to milliamp converter output signals are each routed to a pair of slip rings also mounted on the heat shield on the rotating kiln. These milliamp output signals are directly proportional to the thermocouple input millivolt signals to the millivolt-milliamp converter and are transferred from the kiln to a stationary location through a set of sliding shoes engaging the slip rings. From the stationary location the signals are routed directly to their respective recorders in a control room, using standard shielded wire.

The advantages of the present system over the prior art include the fact that the thermocouples for both subsystems may be identical, thus simplifying procurement and enhancing cost effectiveness, and the materials in both subsystems may be made compatible with the thermocouple millivolt signals, thus achieving greater accuracy and minimizing distortion and interference, since the path for the thermocouple signals from point of junction to millivolt-milliamp converter may be temperature-compensated. Mounting of the millivolt-milliamp converters on the kiln slip ring heat shield eliminates the thermocouple cold junction and associated signal distortion at the slip ring tie points, the sliding shoes' contact points and the stationary shoes' junctions to external receiver or recorder. Conversion of the thermocouple millivolt signal to a milliamp signal eliminates the noise interference, that is, the spikes associated with voltage signals, due to slip ring sliding contact resistance as well as minimizing the long transmission line A.C. interference.

DETAILED DESCRIPTION OF THE INVENTION

Figure 1:
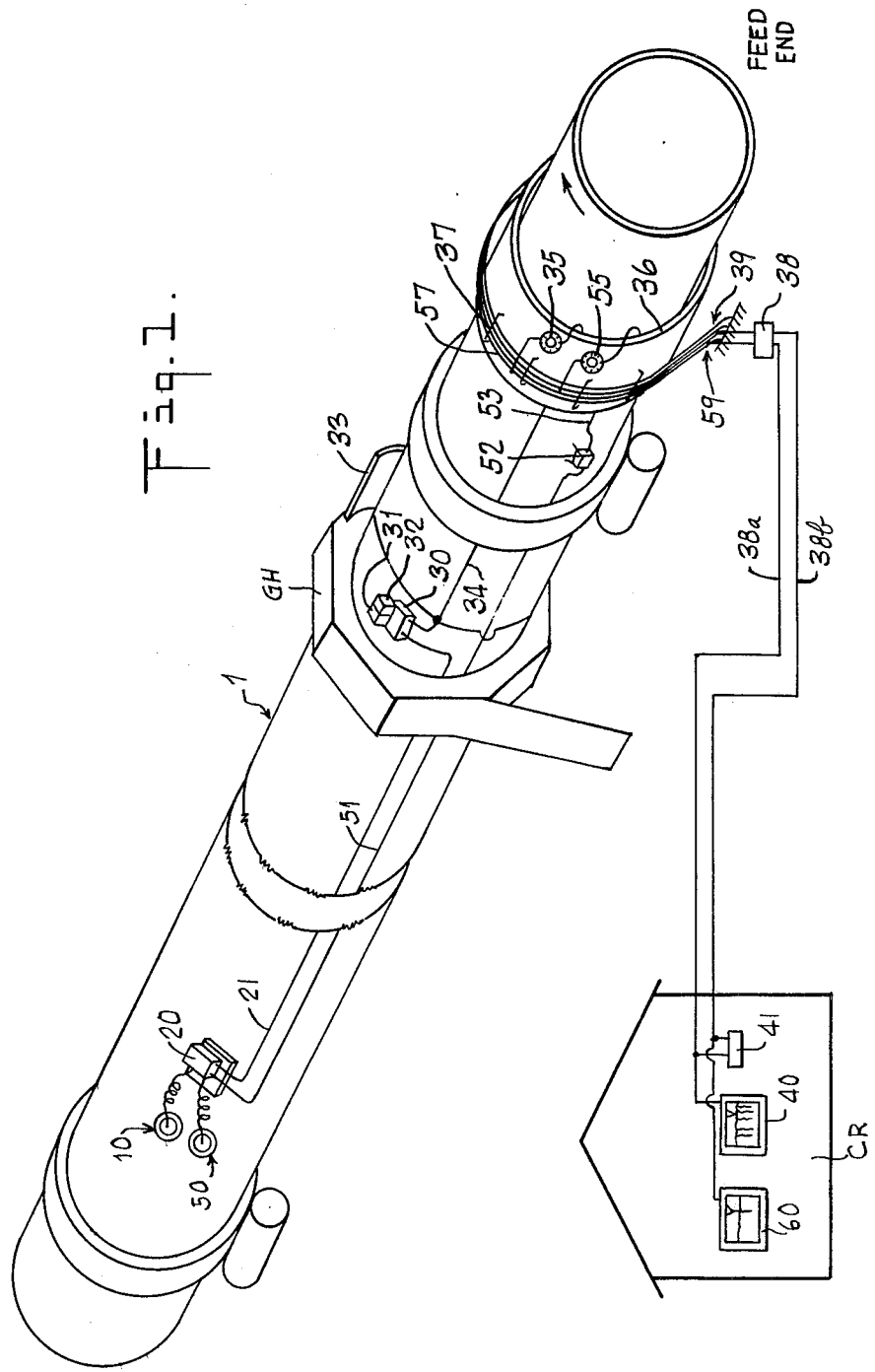
FIG. 1 is a diagrammatic view illustrating a rotary kiln fitted with a thermocouple system in accordance with the present invention along with associated recorder appparatus disposed in an appropriate control room.

A rotary kiln fitted with a thermocouple system in accordance with the present invention along with the associated recorder apparatus disposed in an appropriate control room is shown in FIG. 1.

Figure 2:
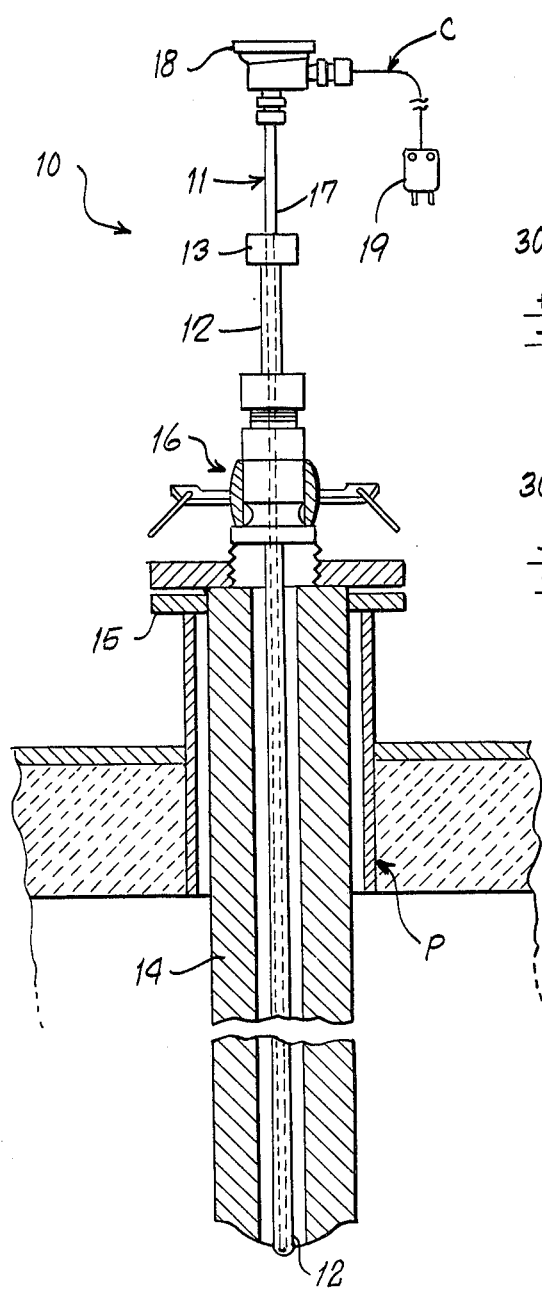
FIG. 2 is a view in elevation and partly in section of one of the semipermanent thermocouples of the system with its mounting in the kiln wall.

Firstly, the system comprises a fixed or semipermanent subsystem consisting of a number of thermocouples installed at designated longitudinal and angular positions along the total length of the kiln 1. One such thermocouple 10 is shown for descriptive purposes, but, for example, twelve such thermocouples may be disposed at spaced intervals both axially and radially on the kiln shell. At each designated location a penetration P is formed in the kiln wall with a flange attachment 15 for receiving the thermocouple element 11, which arrangement is shown in detail in FIG. 2. To protect the semipermanent thermocouple element 11, it is preferably encased in a half-inch Inconel 601 schedule 40 pipe 12 with one end welded closed. The lower end of the thermocouple element 11 is forced against the welded end of the Inconel pipe 12 by a spring modified pipe cap apparatus 13. The thermocouple-Inconel pipe arrangement may be further protected by being inserted in an approximately 1-inch wall thickness cast HL material shield called a thermowell 14. The thermocouple-Inconel pipe combination typically extends 2 inches beyond the end of the thermowell 14 which is mounted directly to the flange attachment 15 on the kiln. A quick disconnect Kamlock fitting 16 on the thermowell 14 permits easy removal of the thermocouple-Inconel pipe combination for inspection, and/or in the event of thermocouple failure or pipe burnout.

The thermocouple element 11 may be of standardized grounded type K calibration, being 36 inches in length with a ¼ inch diameter mineral-insulated Inconel 601 sheath 17 and a plastic miniaturized weatherproof head 18. The thermocouple apparatus may be completed with a 36-inch pigtail of Teflon on Teflon type K calibrated cable C terminated in a standard type K calibrated temperature-compensated male plug 19 with chromel material for the positive lead and alumel material for the negative lead.

Preferably, mounted within an 18-inch radius of each kiln shell thermocouple penetration P and on a 4inch heat-shielding standoff is a junction box 20 with a female-type K thermocouple calibrated receptacle installed in the side, that mates with the male plug 19 on the thermocouple apparatus. This mating arrangement affords quick thermocouple disconnect and easy access to the thermocouple circuitry. Within the junction box 20, a terminal strip may be used for connecting the leads from the female receptacle to a thermocouple output cable 21 which is routed along the kiln shell for carrying out millivolt signals indicative of the temperature sensed by the thermocouple element. All cabling and terminal strips may be of type K calibrated temperature-compensated chromel/alumel material so that the system is comparatively insensitive to temperature changes. Flexible Teflon on Teflon type K calibrated leads may be used within the junction box from the female receptacle to the terminal strip to permit easy exchange should the receptacle fail.

The millivolt signal resulting from the temperature sensed by the thermocouple element is routed from the junction box 20 along the cable 21 to a second junction box 30 in a convenient central location on the kiln allowing 360° angular access thereto. This location may conveniently be just ahead of the kiln gear housing GH on the charge feed end of the kiln as shown in FIG. 1. To ensure accurate signal transmission and capability to withstand kiln temperatures, the signal transmssion cable is preferably ¼ inch diameter mineral-insulated stainless steel sheath type K temperature-compensated cable.

At the central location a series of individual junction boxes, such as box 30, are provided for respectively receiving each of the twelve individual thermocouple signals from the boxes 20. This second set of junction boxes (30) may be mounted on 4-inch heat shielding standoffs circumferentially around the kiln in the same angular or radial plane as the respective individual thermocouple penetration P from which the received signal is routed. These second or central junction boxes (30) may have type K temperature compensated terminals for incoming and outgoing signal leads.

Figure 3:
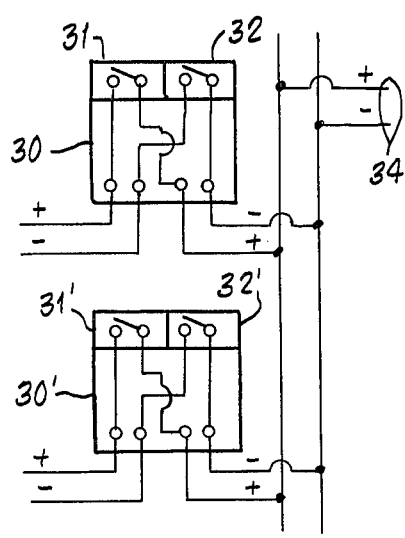
FIG. 3 is a schematic diagram of the switching circuitry for transferring the temperature signals from the set of semipermanent thermocouples to a millivolt to milliamp converter.

Associated with each of these junction boxes (30) is a set of two proximity switches 31, 32, each mounted above its respective junction box so as to be activated by a stationary curved steel plate 33 mounted, for example, on the kiln gear housing GH. As the kiln rotates, the switches 31, 32 on each junction box are successively activated by the stationary plate 33, so that they are actuated in sequence. The curved steel plate 33 may be conveniently located and extends through an arc of about 30°. As shown in FIG. 1, the plate is disposed over the 70° to 105° segment of kiln rotation as observed toward the feed end of the kiln from the discharge end with the zero point being on the vertical axis and the kiln rotating counterclockwise. Two heavy-duty magnetic proximity switches of the single pole, single throw type may be used, one for each thermocouple lead as shown schematically in FIG. 3. At the junction box 30, the positive lead from the thermocouple 10 is routed to an open contact in one proximity switch 31 and the negative lead to an open contact in the second proximity switch 32. The mating contacts in both proximity switches are routed back to the junction box and terminated on individual terminals separate from each other and the incoming signal from the thermocouple 10. Accordingly, the thermocouple signal is separated or isolated until the proximity switches 31, 32 are activated and permit the signal to pass on. The mating leads are looped individually from junction box (30) to junction box (30') to form a continuous or common circuit circumferentially around the kiln 1, such as shown in FIG. 3. At a convenient location, a type K temperature-compensated lead 34 is routed from the common loops to a millivolt to milliamp converter 35, preferably located on a heat shield 36 which is used for mounting a set of slip rings 37 on the kiln 1. The slip ring heat shield 36 completely encircles the kiln 1 at a distance of about 6 inches from the kiln shell surface. The heat shield 36 thus acts as the mounting surface for both the millivolt to milliamp converter 35 and the slip ring apparatus 37.

The millivolt to milliamp converter 35 receives the incoming millivolt thermocouple signals from the common loops and converts them to a directly proportional milliamp signal. The converter 35 is designed for input temperature compensation and for a minimum signal distortion, and when converted the thermocouple signal will be in the form of a milliamp signal so that temperature compensation materials are no longer required and standard copper electrical leads may be used.

The output signal from the converter 35 is tied to the set of slip rings 37, one for the positive lead and one for the negative lead. Each of the rings in the set 37 is continuous and attached to the heat shield 36 so as to completely encircle the kiln. The output signal is transferred from the set of slip rings 37 to a stationary junction box 38, adjacent the kiln, by the use of an arrangement 39 comprising a set of contact brushes or sliding shoes attached to flexible arms mounted on a stationary stand. From the stationary junction box 38, the thermocouple signal may be routed by means of a cable 38a into a central control room CR to the input of a standard multipoint recorder 40 using standard two-conductor instrumentation shielded cabling. In order to operate the millivolt to milliamp converter 35, a 24-volt direct current is required at the slip rings so that a D.C. voltage may be impressed on the incoming signal circuit by a source 41 which is part of the recorder 40 input circuitry in the control room CR.

Depending on the multipoint recorder input requirements, it may be necessary to reconvert the milliamp signal to a standard voltage signal (0–5volts) using a resistor network at the input to the recorder 40, as will be defined by the manufacturer. The recorder 40 also may require modification if it is designed to accept multi-inputs directly, and all the inputs will have to be made common and the recorder keyed to print from a keying system integrated with kiln rotation. A suitable system for this purpose is described in copending application U.S. Ser. No. 250,015 filed concurrently with and assigned to the same assignee as the present application. The converter 35 may also be such as to produce a linearized output signal for recorder use.

The second subsystem in accordance with the present invention is directed to the use of one thermocouple to measure the temperature inside the kiln 1 at a number of longitudinal and angular positions along the kiln. To conveniently permit comparison of the temperatures sensed by both subsystems and the respective thermocouple transmission systems, the shell penetrations 50 for the second subsystem may be disposed at the same longitudinal positions as the first subsystem penetrations, but displaced angularly by 30° as seen in FIG. 1. The single thermocouple for the second subsystem is used to obtain quick response termperature signals, so that only a thermocouple element with a ¼ inch diameter Inconel sheath (corresponding to members 11 and 17 in FIG. 2) is inserted into the kiln for this purpose. The thermowells for the single thermocouple are constructed in the same manner as the thermowells 4 for the first subsystem with the exception that the center of the thermowell is drilled to accept the single thermocouple without the half-inch pipe 12 used in the first subsystem. A Kamlock quick disconnect fitting similar to that used in the first subsystem, but modified to accept the single thermocouple, is used for rapid insertion and removal of this thermocouple. In all other respects, the single thermocouple of the second system may be identical to the thermocouples of the first system.

The junction boxes 20 provided for the first subsystem thermocouple plugs 19, each also contain an identical receptacle for accepting the plug of the second subsystem thermocouple and a terminal strip connecting the leads to individual output cables 51. However, in this second subsystem all of the individual mineral insulated thermocouple cables 51 from the various junction boxes 20 are routed to a single central junction box 52 disposed near the slip ring heat shield 36. In this single junction box 52, all the incoming cables 51 are looped together to form a single output cable 53. Cold junctions and signal distortions are minimized by the use of temperature-compensated junctions in the box 52, that is, the positive lead is of chromel material, and the negative lead is of alumel material.

The single common output cable 53 is routed to a second millivolt to milliamp converter 55 on the slip ring heat shield 36. The milliamp output signal from the converter 55 is transferred to a second set of slip rings 57 on the heat shield 36 and through another arrangement 59 of suitable contact brushes on sliding shoes on a stationary stand and junction box 38 by cable 38b on to an analog recorder 60 in the control room in a similar manner as is accomplished in the first subsystem. The converter 55 is also powered in the same manner.

The recorder 60 for the second subsystem is of an analog type recording a continuous trace, so that no special switching is required for this subsystem.

It will be seen that mounting of the junction boxes 20 with the termination of both subsystems readily accessible and with both thermocouples identical permits a quick cross-check between the subsystems to be made to determine gross system errors and failed thermocouples. The use of standard plugs on the thermocouple pigtails permits an easy check of the thermocouple, or a quick calibration check of the total system all the way through to the recorder, and with long leads a calibration check can be accomplished with the kiln rotating. Further, the use of an unprotected thermocouple in the second subsystem permits a quick accurate record to be made of the cyclical temperature inside the kiln allowing the operators to make immediate process corrections in response thereto. It will also be seen that the present system may be readily adapted to sense other conditions within the kiln besides temperatures and with other kilns and similar rotating devices other than the kiln disclosed.

We claim:

1. A system for transferring signals indicative of the conditions within a rotary kiln to a location off the kiln comprising:
   sensing means, disposed on the kiln, for sensing internal kiln conditions and producing millivolt signals indicative thereof;
   converter means, disposed on the kiln, for converting said millivolt signals to milliamp signals;
   two electrically continuous slip rings disposed on and encircling the kiln and connected across the output of said converter means;
   stationary contact means, adjacent the kiln, for picking off the milliamp signals from said slip rings and transferring them to a location off the kiln;
   a plurality of first access means, disposed in the kiln wall at spaced locations along its length, for permitting said sensing means access to the interior of the kiln and normally having a sensing means disposed therein;
   a plurality of second access means, respectively disposed in the kiln wall at locations adjacent to said first plurality of access means for permitting said sensing means access to the interior of the kiln and normally having no sensing means disposed therein;

electrical plug means, disposed on each sensing means, for conducting said condition indicative millivolt signals;

receptacle means, disposed adjacent to each of said first access means, for accepting said plug means; and means for conducting said millivolt signals from said receptacle means to said converter means.

2. A system as in claim 1 further comprising:

a plurality of sensing means disposed on the kiln at spaced locations along its length;

switching means, disposed on and rotating with the kiln, for transferring said millivolt signals from said sensing means one at a time in sequence to said converter means; and switch actuating means, disposed at a fixed position adjacent the kiln, for actuating said switching means rotating with the kiln.

3. A system as in claim 1 wherein said converter means comprises two millivolt-to-milliamp converters and further comprising:

two additional electrically-continuous slip rings disposed on and encircling the kiln and connected across the output of one of said two converters, said first-recited two slip rings being connected across the output of the other of said two converters;

second stationary contact means, adjacent to the kiln, for picking off the milliamp signals from said two additional slip rings and transferring them to a location off the kiln;

and wherein said receptacle means comprises a plurality of sets of two receptacle members respectively disposed adjacent to each of said first access means, each member accepting one of said plug means;

and wherein said means for conducting said millivolt signals from said receptacle means comprises:

a first set of electrical lead means, connected respectively to each of said receptacle means, for conducting millivolt signals from one of said two receptacle members therein to one of said two converters; and a second set of electrical lead means, connected respectively to each of said receptacle means, for conducting millivolt signals from the other of said two receptacle members therein to the other of said two converters, said second set of electrical lead means comprising switching means for conducting said millivolt signals from said respective receptacle means sequentially to said other of said two converters.

4. A system as in claim 3 wherein said location off the kiln comprises:

multipoint recording means for recording the milliamp signals from said other of said two converters in sequence; and analog recorder means for recording the milliamp signals from said one of said two converters.

5. A system as in claim 3 wherein said sets of two receptacle members are disposed at locations spaced respectively about the kiln circumference and along the kiln length, and said switching means comprises:

a plurality of electrical junction means, disposed adjacent to each other circumferentially about the kiln at spaced locations respectively corresponding to the circumferential spacing of said sets of receptacle members for receiving said millivolt signals respectively from said other of said two receptacle members corresponding thereto; and means associated with each of said electrical junction means for transferring said millivolt signals from said junction means one at a time sequentially in accordance with said circumferential location to said other of said two converters.

6. A system as in claim 3 further comprising heat insulating means, disposed on and spaced from the kiln wall and having said two converters and said four slip rings mounted thereon, for heat shielding said converter means and slip rings from said kiln.

7. A system as in claim 1 wherein said first access means comprises:

a cylindrical member passing through said kiln wall and having a flange on its end externally of the kiln;

thermowell connected to said flange and extending through said cylindrical member into the interior of the kiln; and a quick disconnect fitting on the thermowell for accepting the sensing means.

8. A system as in claim 1 wherein said sensing means is a thermocouple.

9. A system as in claim 8 wherein said thermocouple comprises:

a thermocouple element;

pipe means for encasing said thermocouple element and having one closed end;

spring-loaded means for forcing the lower end of said thermocouple element against the closed end of said pipe means;

a weather-proof head disposed on the other end of said thermocouple element;

an electrical cable connected to said other end of said thermocouple element and extending through said weatherproof head; and an electrical plug connected to the end of said cable.

10. A thermocouple system for sensing temperatures within a rotary kiln and transferring signals indicative of said temperatures to a location off the kiln comprising:

a plurality of thermocouple means, disposed on the kiln at locations respectively spaced about the kiln circumference and along the kiln length, for sensing temperatures within the kiln and producing millivolt signals indicative thereof;

plug means disposed on each of said thermocouple means for conducting said temperature-indicative millivolt signals from said thermocouple means;

a plurality of first electrical junction means respectively disposed on the kiln adjacent to said thermocouple means for accepting said plug means;

a plurality of second electrical junction means disposed on the kiln adjacent to each other circumferentially about the kiln at spaced locations respectively corresponding to the circumferential spacing of said thermocouple means;

a plurality of electrical lead means respectively connected to said first electrical junction means for conducting said millivolt signals from said plug means to said second electrical junction means;

converter means disposed on the kiln for converting said temperature-indicative millivolt signals to milliamp signals;

switching means on said kiln for transferring said millivolt signals from said second junction means one at a time sequentially in accordance with said circumferential location to said converter means;

two electrically-continuous slip rings disposed on and encircling the kiln and connected across the output of said converter means;

stationary contact means adjacent to the kiln for picking off the milliamp signals from said slip rings and transferring them to a location off the kiln;

and wherein said converter means comprises a first and a second millivolt-to-milliamp converter and further comprising:

a plurality of access means respectively disposed in the kiln wall at locations adjacent to said thermocouple means for permitting the access of a thermocouple to the interior of the kiln;

two additional electrically-continuous slip rings disposed on and encircling the kiln and connected across the output of said second converter, said first-recited two slip rings being connected across the output of said first converter;

second stationary contact means adjacent to the kiln for picking off milliamp signals from said two additional slip rings and transferring them to a location off the kiln;

and wherein said plurality of first electrical junction means comprises means for accepting a plug means of a thermocouple disposed in said adjacent access means;

a plurality of second electrical lead means respectively connected to said accepting means for conducting said millivolt signals from said plug means to said second converter; and means for directly conducting the milliamp signals from said second converter to said two additional electrically-continuous slip rings.

11. A system as in claim 10 wherein said switching means comprises a plurality of proximity switches respectively mounted in sets on said second electrical junction means and further comprising switch-actuating means disposed at a fixed position adjacent to the kiln for actuating said proximity switches when rotating with the kiln.

12. A system as in claim 10 wherein said thermocouple means, said plug means, and said plurality of first and second electrical junction means all comprise type K calibrated temperature-compensated material.

13. A method for transferring signals indicative of the conditions within a rotary kiln to a location off the kiln comprising the steps of:

sensing internal kiln conditions concurrently at a number of locations spaced longitudinally and radially along the kiln length and producing first millivolt signals indicative thereof;

sensing said internal conditions one at a time at locations adjacent said number of locations and producing second millivolt signals indicative thereof;

converting said first millivolt signals sequentially to first milliamp signals;

converting said second millivolt signals to second milliamp signals;

communicating said first and second milliamp signals to respective sets of two electrically continuous slip rings disposed on and encircling the kiln and rotating therewith; and picking off said first and second milliamp signals from said sets of slip rings and transferring them to a location off the kiln.

14. The method of claim 13 wherein the condition sensed is temperature.

* * * * *